(12) United States Patent
Miller et al.

(10) Patent No.: US 10,810,529 B2
(45) Date of Patent: Oct. 20, 2020

(54) DIRECTING AN INSPECTOR THROUGH AN INSPECTION

(71) Applicant: Hand Held Products, Inc., Fort Mill, SC (US)

(72) Inventors: Kurt Charles Miller, Trafford, PA (US); Alexander Nikolaus Mracna, Seven Fields, PA (US); Mark Koenig, Pittsburgh, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 806 days.

(21) Appl. No.: 14/531,154

(22) Filed: Nov. 3, 2014

(65) Prior Publication Data

US 2016/0125342 A1    May 5, 2016

(51) Int. Cl.
| | |
|---|---|
| *G06Q 10/06* | (2012.01) |
| *G10L 19/00* | (2013.01) |
| *G06Q 50/30* | (2012.01) |
| *G06F 3/16* | (2006.01) |

(52) U.S. Cl.
CPC ....... *G06Q 10/06316* (2013.01); *G06F 3/167* (2013.01); *G06Q 10/06* (2013.01); *G06Q 50/30* (2013.01); *G10L 19/00* (2013.01)

(58) Field of Classification Search
None
See application file for complete search history.

(56) References Cited

U.S. PATENT DOCUMENTS 5,724,261 A    3/1998  Denny et al.
5,995,936 A *  11/1999 Brais .................. G02B 27/017
                                              369/25.01
6,832,725 B2   12/2004 Gardiner et al.
7,128,266 B2   10/2006 Marlton et al.
7,159,783 B2    1/2007 Walczyk et al.
(Continued)

FOREIGN PATENT DOCUMENTS

JP    2009032206      2/2012
JP    2012123533 A    6/2012
(Continued)

OTHER PUBLICATIONS

Extended European search report for Related EP Application 15192229.1, dated Jan. 8, 2016, 7 pages.
(Continued)

*Primary Examiner* — Alan S Miller
*Assistant Examiner* — Arif Ullah
(74) *Attorney, Agent, or Firm* — Alston & Bird LLP

(57) ABSTRACT

Systems and methods for creating and editing an inspection plan and directing an inspector through an inspection are provided. An exemplary system, according to one implementation, comprises a mobile computing device and a server computer. The mobile computing device is configured to communicate audible prompts to an inspector and receive audible replies from the inspector. The server computer is configured to store an inspection plan comprising a sequence of inspection steps, translate each of the inspection steps of the inspection plan into audible prompts, transmit the audible prompts to the mobile computing device, receive the audible replies from the mobile computing device, and translate the audible replies into a set of inspection results.

20 Claims, 5 Drawing Sheets

(56) References Cited

U.S. PATENT DOCUMENTS

| | | |
|---|---|---|
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |

(56) References Cited

U.S. PATENT DOCUMENTS

| | | |
|---|---|---|
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2002/0095454 A1* | 7/2002 | Reed ............... G06Q 30/0601 709/201 |
| 2002/0138269 A1* | 9/2002 | Philley ............... G10L 15/26 704/260 |
| 2004/0019603 A1* | 1/2004 | Haigh ............... G06F 17/18 |
| 2005/0040224 A1* | 2/2005 | Brinton ............... G06Q 10/06 235/376 |
| 2006/0184369 A1* | 8/2006 | Levonas ............... G09B 5/04 704/275 |
| 2007/0063048 A1 | 3/2007 | Havens et al. |
| 2008/0306740 A1 | 12/2008 | Schuck et al. |
| 2009/0134221 A1 | 5/2009 | Zhu et al. |
| 2010/0036702 A1* | 2/2010 | Sitton ............... G06Q 10/04 705/7.28 |
| 2010/0100377 A1 | 4/2010 | Madhavapeddi et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |

(56) References Cited

U.S. PATENT DOCUMENTS

| | | |
|---|---|---|
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0188473 A1 | 7/2014 | Lambdin et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

European Examination Report in related EP Application No. 15192229.1, dated May 27, 2016, 7 pages. [No new references; US2002/0138269 and US2008/0306740 have been previously cited].

U.S. Appl. No. 14/519,179 for Dimensioning System With Multipath Interference Mitigation filed Oct. 21, 2014 (Thuries et al.); 30 pages.

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 14/676,327 for Device Management Proxy for Secure Devices filed Apr. 1, 2015 (Yeakley et al.); 50 pages.

U.S. Appl. No. 14/257,364 for Docking System and Method Using Near Field Communication filed Apr. 21, 2014 (Showering); 31 pages.

(56) References Cited

OTHER PUBLICATIONS

U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 or Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/724,134 for Electronic Device With Wireless Path Selection Capability filed May 28, 2015 (Wang et al.); 42 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/724,849 for Method of Programming the Default Cable Interface Software in an Indicia Reading Device filed May 29, 2015 (Barten); 29 pages.
U.S. Appl. No. 14/446,391 for Multifunction Point of Sale Apparatus With Optical Signature Capture filed Jul. 30, 2014 (Good et al.); 37 pages.
U.S. Appl. No. 14/722,608 for Interactive User Interface for Capturing a Document in an Image Signal filed May 27, 2015 (Showering et al.); 59 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/724,908 for Imaging Apparatus Having Imaging Assembly filed May 29, 2015 (Barber et al.); 39 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/679,275 for Dimensioning System Calibration Systems and Methods filed Apr. 6, 2015 (Laffargue et al.); 47 pages.
U.S. Appl. No. 14/744,633 for Imaging Apparatus Comprising Image Sensor Array Having Shared Global Shutter Circuitry filed Jun. 19, 2015 (Wang); 65 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 14/744,836 for Cloud-Based System for Reading of Decodable Indicia filed Jun. 19, 2015 (Todeschini et al.); 26 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. 14/405,278 for Design Pattern for Secure Secure Store filed Mar. 9, 2015 (Zhu et al.); 23 pages.
U.S. Appl. 14/745,006 for Selective Output of Decoded Message Data filed Jun. 19, 2015 (Todeschini et al.); 36 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/590,024 for Shelving and Package Locating Systems for Delivery Vehicles filed Jan. 6, 2015 (Payne); 31 pages.
U.S. Appl. No. 29/519,017 for Scanner filed Mar. 2, 2015 (Zhou et al.); 11 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 14/529,857 for Barcode Reader With Security Features filed Oct. 31, 2014 (Todeschini et al.); 32 pages.

(56) References Cited

OTHER PUBLICATIONS

U.S. Appl. No. 29/528,165 for In-Counter Barcode Scanner filed May 27, 2015 (Oberpriller et al.); 13 pages.
U.S. Appl. No. 14/662,922 for Multifunction Point of Sale System filed Mar. 19, 2015 (Van Horn et al.); 41 pages.
U.S. Appl. No. 14/596,757 for System and Method for Detecting Barcode Printing Errors filed Jan. 14, 2015 (Ackley); 41 pages.
U.S. Appl. No. 14/533,319 for Barcode Scanning System Using Wearable Device With Embedded Camera filed Nov. 5, 2014 (Todeschini); 29 pages.
Annex to the communication dated Jan 26, 2018 for EP Application No. 15192229.
Brief Communication for related European Application No. 15192229.1 dated Jul. 6, 2018, 7 pages.
Decision to Refuse for related European Application No. 15192229.1 dated Jul. 6, 2018, 15 pages.
Result of Consultation for related European Application No. 15192229.1 dated Jun. 15, 2018, 3 pages.
Result of Consultation for related European Application No. 15192229.1 dated Jun. 27, 2018, 3 pages.
Summons to Attend Oral Proceedings for related European Application No. 15192229.1 dated Jan. 26, 2018, 10 pages.

\* cited by examiner

DIRECTING AN INSPECTOR THROUGH AN INSPECTION

FIELD OF THE INVENTION

The present invention relates to systems and methods for creating and editing an inspection plan and for directing an inspector through an inspection.

BACKGROUND

Generally speaking, inspections are performed in many fields to check the proper operability of various equipment and systems. For example, automobile inspections may be required in many jurisdictions to check that each automobile being driven on the roads meets certain safety regulations. An automobile inspection may include the steps of checking the lights, braking system, steering system, emission system, and other equipment of the automobile.

Normally, an inspector will check certain features of the various systems and then record information such as measured values, operability, and/or quality of the various components, etc. The process of recording the observations may usually involve checking boxes or writing values on a paper inspection form or entering data in a computer. The conventional recording methods usually require the inspector to redirect his or her focus away from the inspection tasks in order to perform the recording tasks. For example, after an inspector observes one feature, he or she may need to enter the observation before going on to the next feature. As a result of the inspector changing his or her focus between inspection steps and recording steps, errors can easily be made. For example, observed values may be recorded incorrectly or inspection steps may be inadvertently skipped. Therefore, a need exists for assisting an inspector with the steps of performing an inspection.

SUMMARY

Accordingly, in one aspect, the present invention includes an exemplary system that comprises a mobile computing device and a server computer. The mobile computing device is configured to communicate audible prompts to an inspector and receive audible replies from the inspector. The server computer is configured to store an inspection plan comprising a sequence of inspection steps, translate each of the inspection steps of the inspection plan into audible prompts, transmit the audible prompts to the mobile computing device, receive the audible replies from the mobile computing device, and translate the audible replies into a set of inspection results.

In another exemplary embodiment, a voice-data-entry (VDE) inspection system comprises a host computer configured to transmit an inspection plan and receive an inspection result. The VDE inspection system also includes a mobile computing device configured to communicate audible prompts to an inspector and receive audible replies from the inspector. The VDE inspection system further includes a server computer in communication with the host computer and the mobile computing device. The server computer is configured to receive the inspection plan from the host computer, allow an operator to edit the inspection plan, translate the inspection plan into a sequence of audible prompts, transmit the audible prompts to the mobile computing device, receive audible replies from the mobile computing device, translate the audible replies into the inspection result, transmit the inspection result to the host computer.

In yet another exemplary embodiment, a method for a voice-data entry (VDE) inspection using a computer is provided. The method comprises creating a voice form, the voice form having a number of inspection steps. An inspection request is obtained from a remote host computer. The method also includes verifying that the inspection request's steps comply with at least part of the voice form. In addition, a step includes translating the inspection request into a voice plan, the voice plan comprising audible prompts for each inspection step. The method comprises communicating the voice plan's audible prompts sequentially to a voice-enabled, mobile computing device and recording an inspector's audible reply for each audible prompt and communicating the audible replies back to the computer. The method also includes validating the audible replies and translating the replies into inspection results. The inspection results are uploaded to the remote host computer.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention is directed to systems and methods for assisting an inspector with an inspection. Typically while performing an inspection, an inspector will carry a paper inspection form, which tends to engage the inspector's hands and eyes. However, instead of using paper forms or using a computer screen and keyboard, the present invention encompasses systems and methods for creating and editing inspection plans that include "speech" communication between an inspection system and the inspectors. By using voice-directed inspections, the inspectors can be more productive, more accurate, and safer as they move from task to task.

Figure 1:
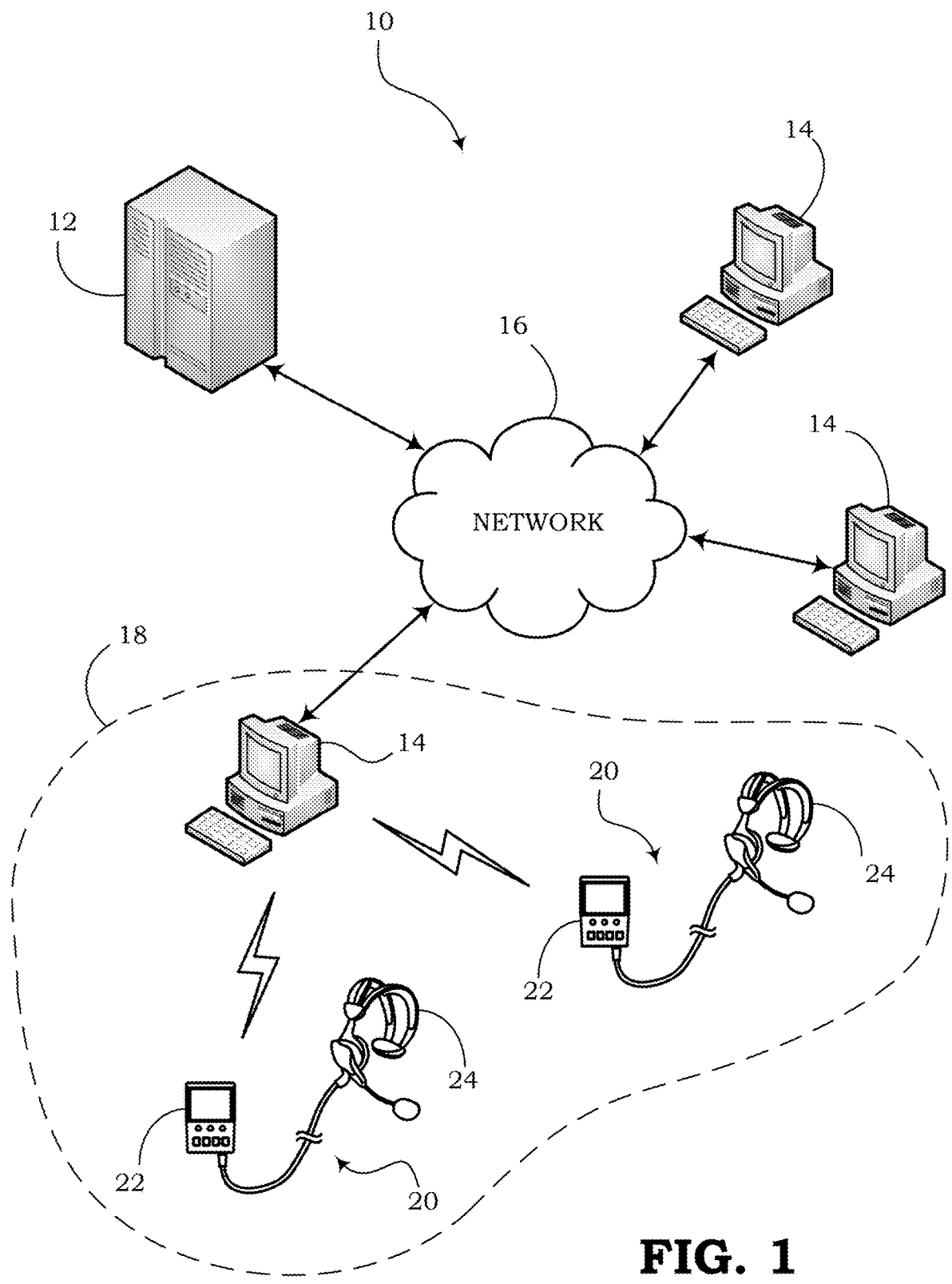
FIG. 1 is a block diagram illustrating a voice-directed inspection system according to various implementations of the present invention.

FIG. 1 shows an exemplary embodiment of a voice-directed inspection system 10. As shown, the voice-directed inspection system 10 includes a host computer 12 and a plurality of site computers 14 configured to communicate with the host computer 12 via a network 16. In some embodiments, the site computers 14 may also communicate with each other via the network 16. The network 16 may be a local area network (LAN), wide area network (WAN), or other suitable network for allowing wired or wireless communication among a number of computing devices.

The host computer 12 may preferably be housed in a central office that services multiple inspection sites 18. The site computer 14 may be housed at a designated inspection site 18 where inspections are performed. For example, the inspection site 18 may be a garage where vehicles are inspected or where other types of transportable objects can be brought. In other cases, the inspection site 18 may be the location of a fixed object being inspected, such as a home or building. When the fixed object is being inspected, the site computer 14 may access the network 16 via a cellular network.

One or more of the site computers 14 may be configured as web servers. The voice-directed inspection system 10 may further include one or more additional servers (not shown), which may be housed at the central office, in a remote office, at a third party location, at one or more of the inspection sites 18, or at another suitable location.

Within the inspection site 18, the site computer 14 is configured to communicate with one or more inspection assistance devices 20. In some embodiments, the site computer 14 and inspection assistance devices 20 may communicate using a wireless protocol, such as BLUETOOTH™. Each inspection assistance device 20 includes at least a portable computer device 22 and a headset 24.

A first process discussed in the present disclosure is the action of preparing one or more inspection plan. For example, an inspection plan may include a specific order of steps to be taken by an inspector during an inspection. A second process of the present disclosure is the action of assisting an inspector through the inspection using the inspection plan prepared in the first process.

To set up the voice-directed inspection system 10, the host computer 12 sends one or more exemplary inspection plans. Each exemplary inspection plan may include a number of sections, wherein each section includes a list of steps to be performed in the inspection. The sections and steps may be arranged to maximize efficiency and accuracy. The site computer 14 is configured to receive the one or more exemplary inspection plans and store the inspection plans.

The site computer 14 may include an inspection plan editor, which is described in more detail below with respect to FIG. 3. The inspection plan editor may be configured to translate the inspection steps received from the host computer 12 into voice instructions. The inspection plan editor may also be configured to enable an operator to modify the voice instructions as needed. For example, when new parts are added to a list of parts to be inspected, the operator may insert additional steps in the instructions, which are translated into additional voice instructions. In some embodiments, the voice-directed inspection system 10 may include a regional server that is configured to modify inspections for each of a plurality of inspection sites 18 within a particular region.

Thus, the voice-directed inspection system 10 is set up when the exemplary inspection plans are downloaded and modified, as needed, for each inspection site 18. After set up, the site computer 14 at each inspection site 18 is configured to communicate the appropriate inspection plan to the respective inspection assistance devices 20. With the inspection plan loaded in the inspection assistance device 20, the inspector may begin the inspection. The voice-directed inspection involves providing audible prompts to the inspector to perform certain steps (e.g., measuring, testing, or observing characteristics of various parts or components) and receiving audible responses from the inspector.

Figure 2:
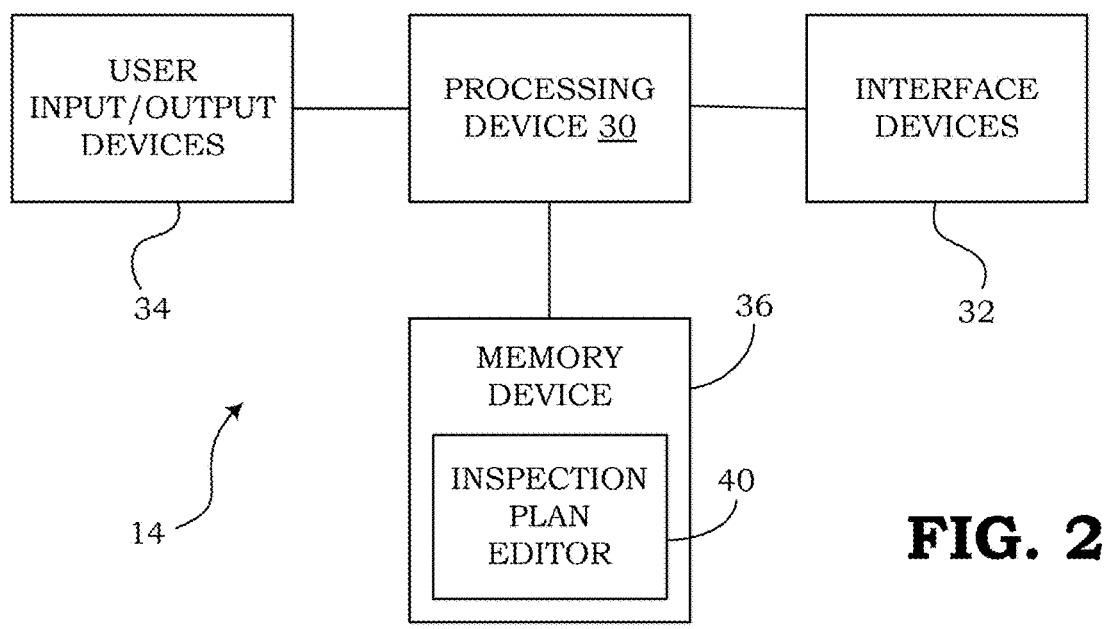
FIG. 2 is a block diagram illustrating an embodiment of one of the site computers shown in FIG. 1.

FIG. 2 is a block diagram illustrating an embodiment of one of the site computers 14 shown in FIG. 1. As shown, the site computer 14 includes a processing device 30, interface devices 32, user input/output devices 34, and a memory device 36. An inspection plan editor 40 may be configured as a software and/or firmware program stored on a non-transitory computer-readable medium in the memory device 36.

The interface devices 32 may include wired or wireless communication devices for allowing communication over the network 18. The interface devices 32 may further include wireless transceivers for communicating with the inspection assistance devices 20.

The user input/output devices 34 may include a web-based graphical user interface (GUI) in which authorized users can view inspection assignments, inspector information, inspection assistance device information, and other system information. At the completion of an inspection, the inspectors can review their results on a display device of the user input/output devices 34. The display device may be a web browser. The inspectors can then confirm the inspection and enter a "submit" input to submit the completed inspection data to the host computer 12.

The user input/output devices 34 may include other input mechanisms and output mechanisms. For example, input mechanisms may include various data entry devices, such as keyboards, keypads, buttons, switches, touch pads, touch screens, cursor control devices, computer mice, stylus-receptive components, microphones, cameras, or other data entry devices. Output mechanisms may include various data output devices, such as computer monitors, display screens, touch screens, speakers, buzzers, alarms, notification devices, lights, light emitting diodes, liquid crystal displays, visual display devices, audio output devices, or other data output devices. The user input/output devices 34 may also include interaction devices configured to receive input and provide output, such as interaction devices, dongles, touch screen devices, and other input/output devices, to enable input and/or output communication with a user.

The processing device 30 may be a general-purpose or specific-purpose processor, microprocessor, or microcontroller for controlling the operations and functions of the site computer 14. In some implementations, the processing device 30 may include a plurality of processors for performing different functions.

The memory device 36 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc.

The inspection plan editor 40 of the present disclosure may be implemented in hardware, software, firmware, or any combinations thereof. In some embodiments, the inspection plan editor 40 may be implemented in software or firmware that is stored on the memory device 36 and that is executable by a suitable instruction execution system, such as the processing device 30. If implemented in hardware, the inspection plan editor 40 may be implemented using discrete logic circuitry, an application specific integrated circuit (ASIC), a programmable gate array (PGA), a field programmable gate array (FPGA), or any combinations thereof.

The inspection plan editor 40 may comprise an ordered listing of executable instructions for implementing logical functions. The inspection plan editor 40 can be embodied in any non-transitory computer-readable medium for use by an instruction execution system or device, such as a computer-based system, processor-controlled system, etc. In the context of the present disclosure, a non-transitory computer-readable medium can be any medium that can contain, store, communicate, propagate, or transport programs for execution by the instruction execution system or device.

It should be understood that the routines, steps, processes, or operations described herein with respect to the inspection plan editor 40 may represent any module or code sequence that can be implemented in software or firmware. In this regard, these modules and code sequences can include commands or instructions for executing the specific logical routines, steps, processes, or operations within physical components. It should further be understood that two or more of the routines, steps, processes, and/or operations described herein may be executed substantially simultaneously or in a different order than explicitly described, as would be understood by one of ordinary skill in the art.

Figure 3:
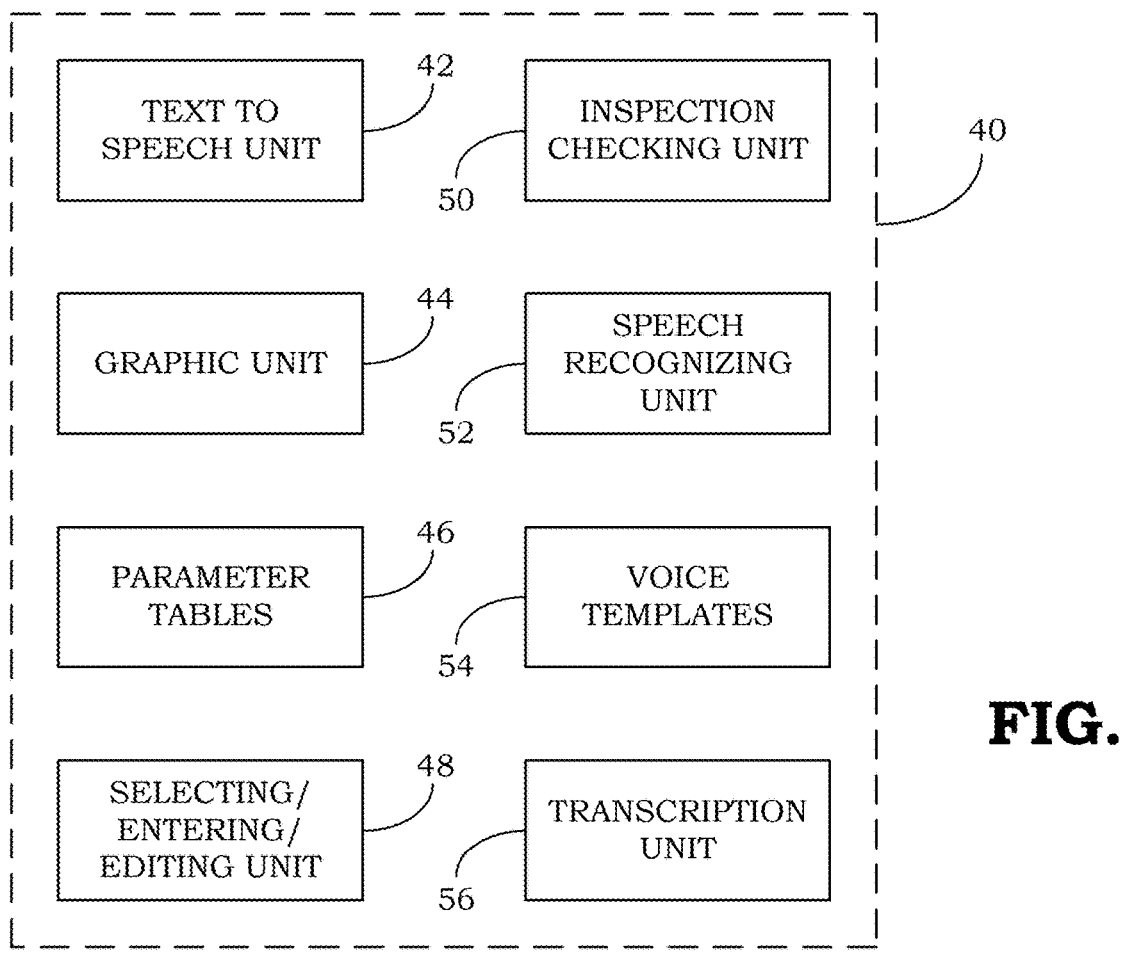
FIG. 3 is a block diagram illustrating an embodiment of the inspection plan editor shown in FIG. 2.

FIG. 3 is a block diagram illustrating an embodiment of the inspection plan editor 40. The inspection plan editor 40 allows a user, such as an administrator of one or more inspection sites 18, to enter a number of parameters related to an inspection plan. The inspection plan editor 40 enables the user to create a new inspection plan and/or to edit an existing inspection plan. After the user has gone through the process of creating and/or modifying the inspection plan, the inspection plan can then be communicated to the inspection assistance device 20 for directing the inspector through an inspection. The created and/or modified inspection plan can be used by one or more inspectors as needed.

The inspection plan editor 40 may utilize a text-to-speech (TTS) unit 42 to translate inspection instructions from textual form to voice. In addition, the inspection plan editor 40 may utilize a graphics unit 44 in coordination with a graphical user interface of the user input/output devices 34 to graphically display the textual inspection instructions in order to simplify the user experience.

The inspection instructions include various parameters that can be configured by the user. The parameters for defining the inspection instructions can be stored in parameter tables 46 of the inspection plan editor 40. The inspection plan editor 40 allows the user to select, enter, and/or edit the parameters using a selecting/entering/editing unit 48. For example, the user may select/enter/edit a textual prompt that will be provided in speech form to the inspector at the beginning of the inspection. The user may also select, enter, and/or edit a TTS prompt that the inspector will hear when the inspector requests for help.

Furthermore, the selecting/entering/editing unit 48 of the inspection plan editor 40 allows the user to select, enter, and/or edit a limit representing a maximum number of choices to be provided in a list. The inspection plan editor 40 may define a unique identifier of the inspector's choice that is reported back to the host computer 12. For numerical entry, the user can define the minimum and maximum acceptable values for various observable parameters, as well as the minimum and maximum digits allowed.

The user can also choose whether the inspector's choice receives a confirmation for various situations. The selecting/entering/editing unit 48 also allows the user to select, enter, and/or edit the type of confirmation provided, if applicable.

The selecting/entering/editing unit 48 of the inspection plan editor 40 also enables the user to choose whether a display will be used in parallel with the voice instructions. In addition, the user may select, enter, and/or edit what images will be displayed on the portable computer device 22 for different situations.

In addition, the inspection plan editor 40 allows the user to select, enter, and/or edit conditional actions, if needed. For example, if the inspector encounters a first condition, the inspection plan editor 40 can provide follow-up actions as defined by the user.

The inspection plan editor 40 also allows the user to choose whether the inspector may utilize a scanner to enter values (e.g., alphanumeric entries). In addition, voice input may be defined for entering times and dates.

The inspection plan editor 40 further includes a speech recognition unit 52. For words and phrases that inspectors use repeatedly, such as numbers and letters, the speech recognition unit 52 relies on saved voice templates 54 that inspectors train when beginning to use the voice system. As inspectors continue to use the words in their responses with the varying inflections of normal human speech, the speech recognition unit 52 automatically adapts the voice templates 54. Over time, the adaptation of an inspector's voice templates 54 improves the performance of the speech recognition unit 52.

The speech recognition unit 52 can also recognize voice selections from long item lists. Voice software running on the inspection assistance device 20 uses a speaker-independent recognition system based on phonemes (word parts) to create the voice templates 54. The headsets 24 may use the voice software to recognize speech and account for changes in speaking patterns over time and in different environments in order to improve voice recognition and system performance.

At times, an inspector may need to add free-form recorded audio when selections in the inspection plan are not sufficient to encompass every possibility. In this case, a transcription unit 56 of the inspection plan editor 40 can be used to recognize and automatically convert voice to text. However, since automated transcription may not always be correct, inspectors can review the text and correct it as needed after the inspection is complete. An inspection-checking unit 58 of the inspection plan editor 40 enables the inspectors to review the inspection results.

According to some embodiments, one or more inspection plans may be created and/or modified at the host computer 12, at an inspection site 18, or at another location in communication with the network 16. Once the inspection plans are complete, they may be transmitted to one or more of the site computers 14 within the voice-directed inspection system 10 to allow the respective inspection sites 18 to benefit from the new or modified inspection plans. The inspection plans can then be stored in the memory device 36 of the various site computers 14.

In some embodiments, the host computer 12 may communicate with the site computers 14 to provide instructions regarding which steps of the inspection plan are to be performed. In this respect, each inspection plan may be a comprehensive plan including all possible inspection steps. The host computer 12 can then select a subset of steps from the comprehensive plan. This allows changes to be made in an efficient manner without relying on each inspector's ability to make appropriate modifications. However, if needed, the inspection plans can be modified at each inspection site 18 to account for the particular features of that inspection site 18.

When the memory device 36 of the site computer 14 is updated with the new and/or modified inspection plan(s), the site computer 14 can transmit the plan to the inspection assistance device(s) 20 according to an inspection schedule. As the inspector performs the steps defined in the inspection plan, the results of each step are transmitted back to the site computer 14 and stored in the memory device 36 with the inspection plan editor 40. After the inspection is complete and the inspector checks the inspection results, the stored inspection results can be transmitted from the site computer 14 to the host computer 12. Transmission of the network 16 may include Internet encryption, such as secure sockets layer (SSL) encryption.

The inspection-checking unit 50 is used when an inspector finishes an inspection. The inspector can view the results using a graphical user interface of the user input/output devices 34. When free-form speech is entered by the inspector using the transcription unit 56, the transcript can be viewed and edited as needed. The inspection-checking unit 58 may also be configured to allow viewing of inspection assignments, inspection assistance device operators, and other system information. With inspector confirmation, the inspection-checking unit 58 enables the processing device 30 to submit the completed data to the host computer 12 via the interfaces devices 32.

The inspection-checking unit 58 provides users with the ability to view information about each inspection step on mobile devices or PCs running supported browsers. In addition, the portable computer device 22 may be configured to serve web pages to browsers on the same local area network (LAN) as the site computer 14.

Figure 4:
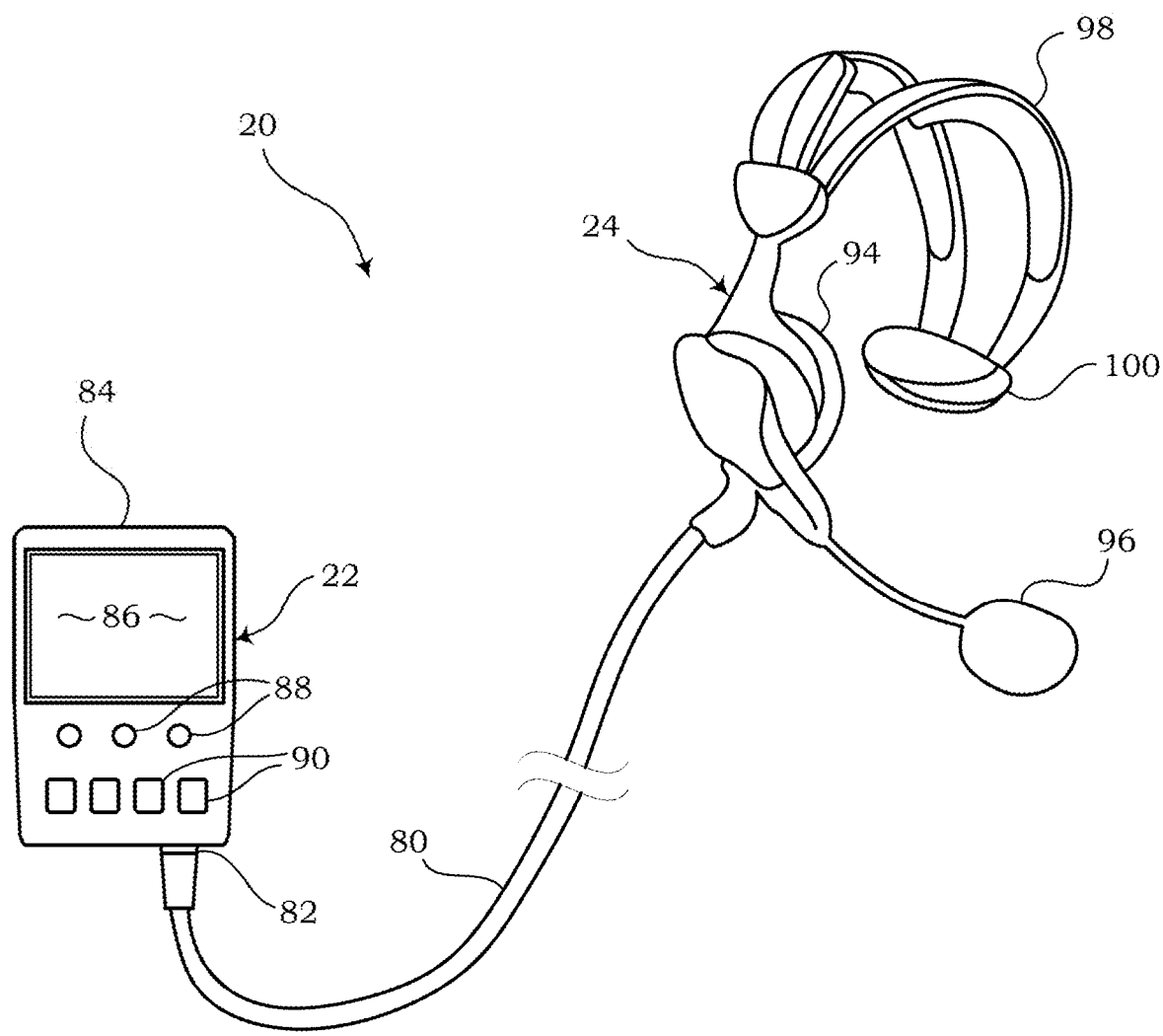
FIG. 4 is a diagram illustrating an embodiment of the inspection assistance device shown in FIG. 1.

FIG. 4 is a diagram illustrating an embodiment of one or more of the inspection assistance devices 20 shown in FIG. 1. The inspection assistance device 20 includes the portable computer device 22 and headset 24, which can communicate with each other via cable 80 or over a wireless communication channel, such as BLUETOOTH™. The portable computer device 22 includes an input port 82, which is configured to be connected to a connector of the cable 80. The portable computer device 22 also includes a housing 84, a display screen 86, indicators 88, and input devices 90.

The headset 24 includes an audio output device 94 (e.g., speaker), an audio input device 96 (e.g., microphone), one or more straps 98, and padding 100. The padding of the audio input device 96 along with the straps 98 and padding 100 are configured to keep the headset 24 on a user's head during use.

The portable computer device 22 may be configured to run voice software, which supports efficient voice dialogs, speech recognition, noise cancellation, and language support. The portable computer device 22 translates textual instructions into audible commands, which are output through the audio output device 94. Also, the portable computer device 22 converts the inspector's speech received through the audio input device 96 into output data that is sent back to the site computer 14. In some embodiments, the portable computer device 22 may have an integrated imager that can scan and capture barcodes.

Figure 5:
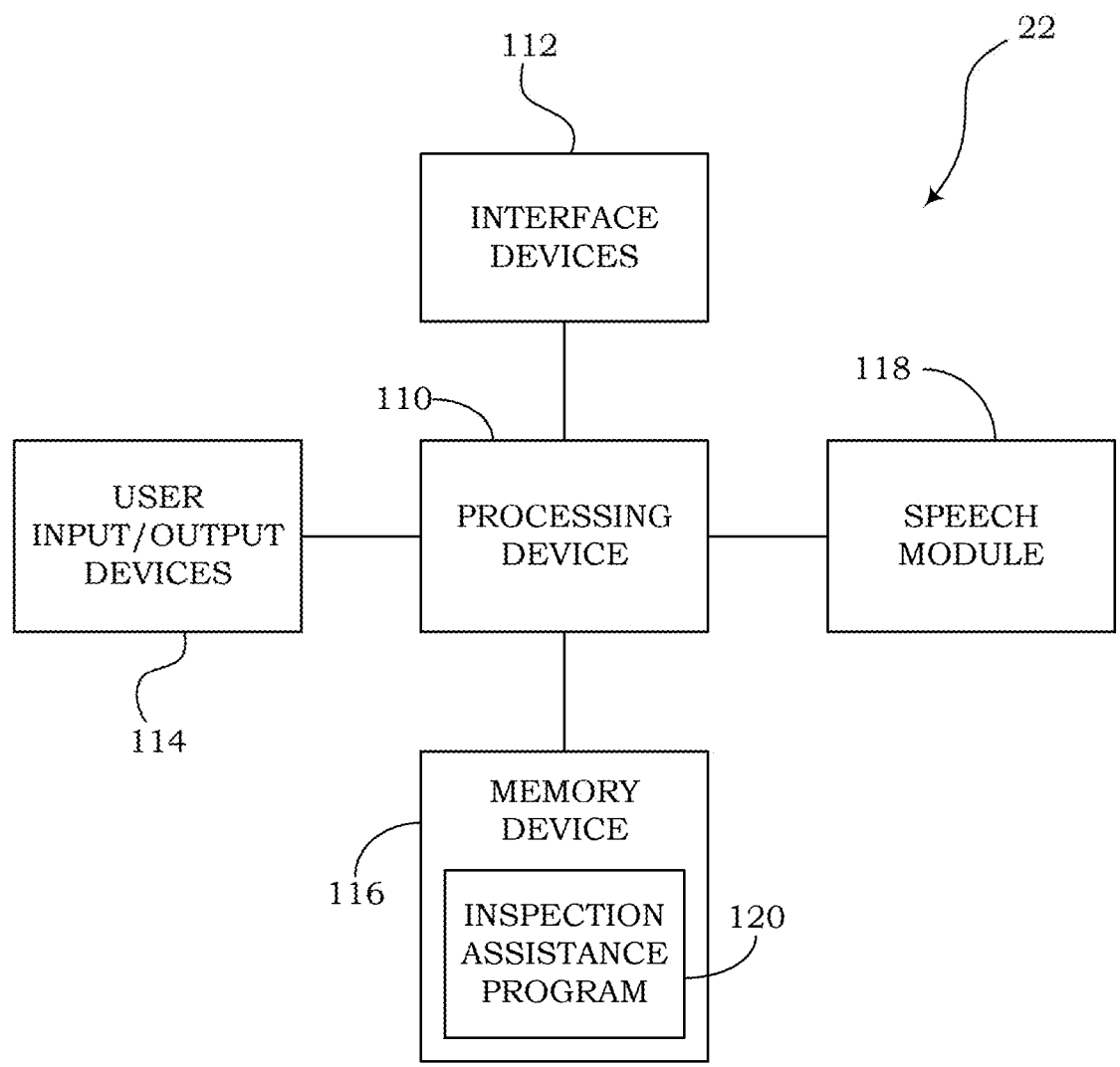
FIG. 5 is a block diagram illustrating an embodiment of the portable computer device shown in FIG. 4.

FIG. 5 is a block diagram illustrating an embodiment of the circuitry of the portable computer device 22. In this embodiment, the portable computer device 22 includes a processing device 110, interface devices 112, user input/output devices 114, a memory device 116, and a speech module 118. An inspection assistance program 120 may be configured in software and/or firmware and stored in the memory device 116 and/or may be configured in hardware within the portable computer device 22.

The interface devices 112 may include the input port 82 as shown in FIG. 4 for coupling with the cable 80. Alternatively, the interface devices 112 may include a short-range wireless communication transceiver for wirelessly communicating with the headset 24. The interface devices 112 also include a transceiver or other suitable wired or wireless communication device for communicating with the site computer 14. Therefore, the interface devices 112 allow the portable computer device 22 to receive inspection plans from the site computer 14 and provide inspection steps to the headset 24. When a step is performed by the inspector, the interface devices 112 receive inspection results from the headset 24 and communicate the results to the site computer 14.

The user input/output devices 114 may include the display screen 86, indicators 88, and input devices 90 shown in FIG. 4. The user input/output devices 114 may include other suitable mechanisms for receiving input from and providing output to a user.

The speech module 118 is configured to translate text to speech and to translate speech to text. For example, textual inspection steps may be translated into speech form that the inspector can understand. The speech module 118 may use other methods for conversion to speech, such as processing digital audio signals and converting to analog speech. The speech module 118 may include a text-to-speech (TTS) module.

Figure 6:
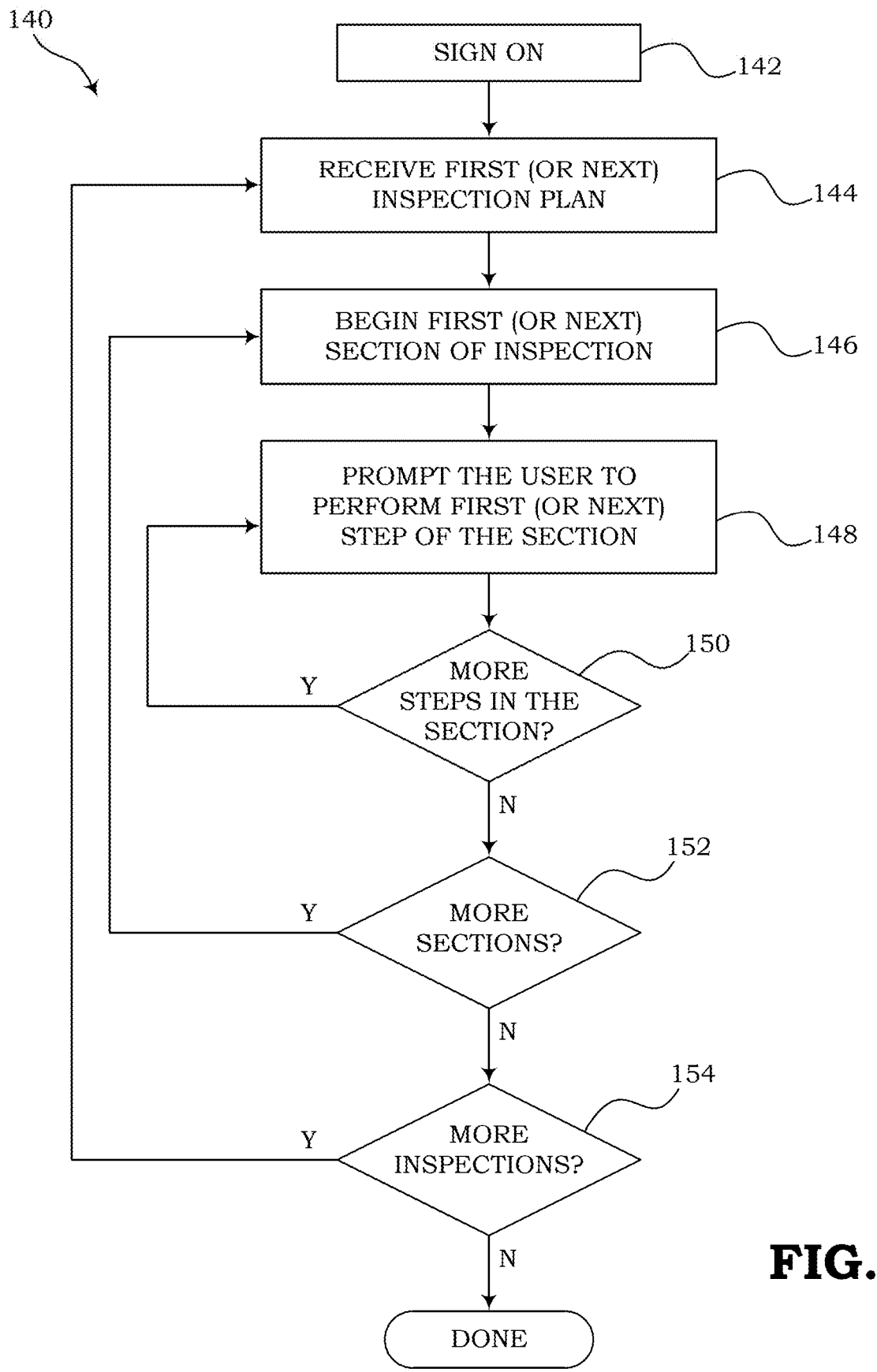
FIG. 6 is a flow diagram illustrating a method of the inspection assistance program shown in FIG. 5.

FIG. 6 is a flow diagram showing a method 140 of the inspection assistance program 120 shown in FIG. 5. When an inspection plan is ready to be used, after the site computer 14 has received the inspection plan from the host computer 12 and edited it as needed, the method 140 may be performed.

The method 140 includes a first step 142 of enabling a user (i.e., inspector) to sign on. The sign-on process involves determining whether the user is authorized to perform an inspection. The sign-on process may also include identifying the user and/or information about the user and identifying the inspection assistance device 20 being used.

The inspection assistance program 120 prompts the inspectors to sign on at the beginning of the process before they can begin any work. The inspection assistance program 120 may use assigned inspector IDs for sign on and for tracking the inspectors within the system. The sign-on process may include requesting a spoken password and verifying that the password corresponds to the inspector ID. IDs and passwords may be stored in the memory device 116 of the portable computer device 22 and/or in the memory device 36 of the site computer 14. Passwords can be set or reset through a user interface on the site computer 14 or portable computer device 22.

As shown in block 144, the method 140 includes receiving a first (or next) inspection plan. Block 144 may involve the user carrying the inspection assistance device 20 within wireless communication range of the site computer 14 in order that the inspection assistance device 20 can wirelessly receive the first (or next) inspection plan from the site computer 14. Alternatively, the portable computer device 22 may join a local area network via a wireless router for connection to the network 18 via a modem.

The particular inspection plan to be followed may be issued automatically, whereby the portable computer device 22 downloads the issued inspection plan from the site computer 14. Alternatively, the inspector may be assigned a particular inspection plan that is identified by the inspector, whereby the sign on process 142 includes the step of receiving input from the inspector. For example, the inspector may request inspection work by scanning a work ID or by speaking two or more digits of the work ID. A work ID can be an assignment number as determined by the host computer 12 and may be numeric or end in numeric digits. Since the work ID may be several digits in length, the inspector may simply speak only the last two digits to increase worker accuracy and speed.

The inspection assistance program 120 attempts to match the entered work ID with an existing work ID in the system. If there are no matches with an available assignment for the work ID entered, an audio message of "no assignments found" can be provided to the inspector and the work ID prompt of the sign on process 142 is repeated. However, if there are multiple matches, the inspection assistance program 120 may request that the inspector choose a work ID from a list. When a work ID is selected from the list, the inspection assistance program 120 may prompt the inspector to confirm the work ID, to which the inspector may respond with "yes," "no," or "cancel."

When the inspection plan is received, the inspection assistance program 120 is configured to begin a first section of the inspection plan, as indicated in block 146. It should be noted, for example, that the inspection plan might include multiple sections, where each section pertains to a particular system or group of systems of the object being inspected. An automobile inspection plan, for example, may include many sections representing many distinct systems of the automobile. Sections of an automobile inspection plan may include a section related to the lights of the automobile, a section related to the braking system of the automobile, a section related to the steering system, a section related to emissions components, among other sections.

Block 146 may include the step audibly asking the inspector if the inspector wishes to perform the steps of the first (or next) section and then waiting for a response. For example, a question may be audibly communicated to the inspector using a prompt such as "Do you want to inspect the braking system now?" If the inspector responds with "yes," then the method 140 proceeds to block 148. Otherwise, if the user response with "no," then the inspection assistance program 120 may go on to the next section. At the end of the inspection, the inspection assistance program 120 may return to the skipped sections and prompt the user again.

The inspection assistance program 120 allows the inspectors to bypass entire sections by saying, "skip section" when the device prompts them to begin a section. The inspector may also skip a section at any step within the section. If a section is only partially complete, the inspection assistance program 120 records the completed steps and skips the remaining steps of the section to go to the next section. At the end of each section with skipped steps, the inspection assistance program 120 may ask the inspector if he or she wants to return to complete the skipped steps.

Block 148 includes prompting the user to perform a first (or next) step of the particular section of the inspection. The prompt may simply be a yes/no question, such as, "Is the thickness of the brake pads sufficient?" Alternatively, the prompt may be an instruction, such as, "Measure the thickness of the left rear brake pads." The inspection assistance device 20 then waits for a response from the inspector.

The inspection assistance program 120 allows inspectors to bypass individual steps by saying "skip step" at any step within a standard section or within the parts section of the workflow. Similar to "skip step," the inspection assistance program 120 allows inspectors to speak "does not apply" at a step prompt to bypass the information entry for that step. The inspection assistance program 120, however, does not accept the "does not apply" command for certain steps, such as those that may be deemed as mandatory. The inspection plan sent from the host computer 12 identifies any steps that may be deemed mandatory for inspectors to perform. The difference is that the "does not apply" command instructs the inspection assistance program 120 to mark the step as one that is skipped and not to be returned to, whereas "skip step" leaves the step open for later entry.

As indicated in decision block 150, the method 140 determines if there are more steps of the particular section. If so, the method 140 returns back to block 148 and prompts the user to execute the next step. Otherwise, if all steps of the section have been completed, the method 140 proceeds to decision block 152 and determines if there are more sections of the inspection. Determining if there are more sections may include returning to sections that were previously skipped. If there are more sections, the method 140 returns back to block 146 and begins the next section.

Otherwise, if all the sections have been completed, the method 140 determines that the inspection is complete and proceeds to decision block 154. The user may remain signed-on after completing an inspection in order to perform additional inspections. If another inspection is to be performed by the user, the flow of the method 140 loops back from block 154 to block 144, and the inspection assistance device 20 receives the next inspection plan. If no more inspections are to be done, the user may sign off.

When the inspector is finished working for the day, the inspector can sign off. The inspector may also sign off at any time during the inspection process. If an inspector signs off in the middle of an inspection, the work for that inspection can be continued by any inspector who signs on to any inspection assistance device 20 at the inspection site 18 and requests that assignment.

After all non-parts inspection sections are completed, the inspection assistance program 120 prompts for parts entry. A section designated for parts allows a voice-directed inspection process to include material tear-down and the collection of parts information.

The inspection assistance program 120 first attempts to identify a part by prompting inspectors for a part number. With this input, the inspection assistance program 120 searches for matches in a parts list received from the host computer 12.

If inspectors cannot enter a part number, they can issue the "switch input" command to instruct the inspection assistance program 120 to prompt for and match part names instead of part numbers. In this case, inspectors can either spell two or more letters of the part name or speak the entire name. If the inspection assistance program 120 finds one or more parts that match the inspector's entry, it speaks the matches one at a time for inspectors to select or pass with a "yes" or "no" response.

If the inspection assistance program 120 finds no matches for the part entry, the inspectors are returned to the part number/part name prompt where they can issue the "review all" command to hear and select from the list of parts that have not yet been processed. It may be noted that speaking part numbers usually produces better speech recognition than speaking part names and usually results in a higher matching rate.

If inspectors have trouble with the identification of specific parts, they can set those parts aside until more parts have been inducted. This way, the parts list will be much shorter when the inspectors issue a "review all" command.

During any step in the part processing workflow, an inspector can speak the "part complete" command to stop entering information for that part. The inspection assistance program 120 prompts the inspector to confirm the command, and on a "yes", response marks all remaining steps as "does not apply." The inspection assistance program 120 then returns to the part number/part name prompt for the next part entry. Additionally, the completed part is removed from the list of parts that are available for processing.

The inspection-checking unit 58 of the inspection plan editor 40, as described able, enables the inspectors to review inspection results before submitting the results to the host computer 12. The inspection assistance program 120 prompts the inspector to perform the review via the site computer 14 or a supported web browser. During this review, inspectors have a chance to view their responses to the various inspection steps and edit any transcribed audio that was recorded.

The flow diagram of FIG. 6 shows the architecture, functionality, and operation of possible implementations of the inspection assistance program 120 shown in FIG. 5. In this regard, each block may represent a module, segment, portion of code, etc., which comprises one or more executable instructions for performing the specified logical functions.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,526;
U.S. Pat. Nos. 8,798,367; 8,807,431;
U.S. Pat. Nos. 8,807,432; 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;

U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

The invention claimed is:

1. A system for executing a voice-data-entry (VDE) inspection, the system comprising:
   a mobile computing device comprising a speaker and a microphone, the mobile computing device being configured to (i) communicate audible prompts to an inspector by way of at least one speaker and (ii) in response to communicating the audible prompts, receive audible replies from the inspector by way of at least one microphone; and
   a server computer in communication with the mobile computing device, the server computer configured to (i) store an inspection plan comprising a sequence of inspection steps, wherein the sequence of inspection steps comprises at least one mandatory-inspection step marked as mandatory in the inspection plan, (ii) translate each of the inspection steps of the inspection plan into audible prompts, (iii) transmit the audible prompts to the mobile computing device in accordance with the inspection plan, (iv) receive the audible replies from the mobile computing device, (v) translate the audible replies into a set of inspection results, and (vi) allow an operator to alter the inspection plan by changing details of an inspection step of the inspection steps, wherein the mobile computing device is further configured to:
   receive, by way of the at least one microphone, an audible instruction from the inspector to skip a section of the inspection plan, wherein the section is skipped by skipping a step within the section;
   skip the section of the inspection plan identified by the audible instruction to skip the section;
   provide, by way of the at least one speaker, audible prompts for another section of the inspection plan;
   receive, by way of the at least one microphone, the inspector's audible replies to the audible prompts for the other section; determine whether the section skipped by the inspector comprises of the step skipped which is marked as the at least one mandatory inspection step in the inspection plan;
   in response to completion of the other section and in an instance in which the section skipped by the inspector comprises the step skipped which is marked as the at least one mandatory inspection step, provide, by way of the at least one speaker, at least one audible prompt for completing the skipped section of the inspection plan by performing the step skipped which is marked as the at least one mandatory inspection step;
   determine that the inspection plan is complete in an instance in which the sequence of inspection steps, including the at least one mandatory inspection step, is completed;
   determine whether a new part is to be inspected during inspection; and in response to the determination that the new part is to be inspected, modify the existing inspection plan by adding new inspection steps corresponding to the new part.

2. The system according to claim 1, wherein the server computer comprises an editing unit configured to allow the operator to alter the inspection plan by changing the details of the inspection step.

3. The system according to claim 2, wherein:
   the details of the inspection step comprise an audible prompt that the inspector hears, at least partially by way of the speaker of the mobile computing device, at the start of the inspection step; and
   the editing unit of the server computer is configured to allow an operator to alter the audible prompt.

4. The system according to claim 2, wherein:
   the details of the inspection step comprise an audible prompt that the inspector hears, at least partially by way of the speaker of the mobile computing device, upon a request for help; and
   the editing unit of the server computer is configured to allow an operator to alter the audible prompt.

5. The system according to claim 2, wherein:
the details of the inspection step comprise number of items that the inspector may choose from, at least partially by way of the mobile computing device, in a list of possible audible replies; and
the editing unit of the server computer is configured to allow an operator to alter the list of possible audible replies.

6. The system according to claim 2, wherein:
the details of the inspection step comprise a unique identifier for the inspector's choice from a list of identifiers; and
the editing unit of the server computer is configured to allow an operator to alter the list of identifiers.

7. The system according to claim 2, wherein:
the details of the inspection step comprise a confirmation requirement for an inspection step; and
the editing unit of the server computer is configured to allow an operator to alter the confirmation requirement.

8. The system according to claim 2, wherein:
the details of the inspection step comprise conditional logic to enable the transmission of an audible prompt based on at least one previous audible reply; and
the editing unit of the server computer is configured to allow an operator to alter the conditional logic.

9. The system according to claim 2, wherein:
the mobile computing device comprises a display;
the details of the inspection step comprise image information to be displayed on the mobile computing device's display during an inspection step; and
the editing unit of the server computer is configured to allow an operator to alter the image information.

10. The system according to claim 2, wherein:
the mobile computing device comprises at least one sensor selected from the group consisting of a camera, a scanner, an optical character recognition (OCR) device, an imaging scanner, an RFID reader, a wireless scanner, a serial scanner, and a temperature sensor, the details of the inspection step comprise audible prompts for the inspector to use the at least one selected sensor to gather data, and
the editing unit of the server computer is configured to allow an operator to alter the audible prompts for the inspector to use the at least one selected sensor to gather data.

11. The system according to claim 2, wherein:
the details of the inspection step comprise maximum and minimum limits, and
the editing unit of the server computer is configured to allow an operator to alter the maximum and minimum limits.

12. The system according to claim 2, wherein:
the details of the inspection step comprise date-specific information, and
the editing unit of the server computer is configured to allow an operator to alter the date-specific information.

13. The system according to claim 2, wherein the editing unit is configured to graphically display the details of the inspection step.

14. A voice-data-entry (VDE) inspection system, the VDE inspection system comprising:
a host computer configured to (i) transmit an inspection plan comprising a sequence of inspection steps, wherein the sequence of inspection steps comprises at least one inspection step marked as mandatory in the inspection plan, and (ii) receive an inspection result;
a mobile computing device comprising a speaker and a microphone, the mobile computing device being configured to (i) communicate audible prompts to an inspector by way of at least one speaker and (ii) in response to communicating the audible prompts, receive audible replies from the inspector by way of at least one microphone;
a server computer in communication with the host computer and the mobile computing device, the server computer configured to (i) receive the inspection plan from the host computer, (ii) allow an operator to alter the inspection plan by changing details of an inspection step of the inspection plan, (iii) translate the inspection plan into a sequence of audible prompts, (iv) transmit the audible prompts to the mobile computing device, (v) receive audible replies from the mobile computing device, (vi) translate the audible replies into the inspection result, (vii) transmit the inspection result to the host computer, wherein the mobile computing device is further configured to:
receive, by way of the at least one microphone, an audible instruction from the inspector to skip a section of the inspection plan, wherein the section is skipped by skipping a step within the section;
skip the section of the inspection plan identified by the audible instruction to skip the section;
provide, by way of the at least one speaker, audible prompts for another section of the inspection plan;
receive, by way of the at least one microphone, the inspector's audible replies to the audible prompts for the other section;
determine whether the section skipped by the inspector comprises of the step skipped which is marked as the at least one mandatory inspection step in the inspection plan; in response to completion of the other section and in an instance in which the section skipped by the inspector comprises the step skipped which is marked as the at least one mandatory inspection step, provide, by way of the at least one speaker, at least one audible prompt for completing the skipped section of the inspection plan by performing the step skipped which is marked as the at least one mandatory inspection step;
determine that the inspection plan is complete in an instance in which the sequence of inspection steps, including the at least one mandatory inspection step, is completed, determine whether a new part is to be inspected during inspection; and in response to the determination that the new part is to be inspected, modify the existing inspection plan by adding new inspection steps corresponding to the new part.

15. The VDE inspection system according to claim 14, wherein:
the details of the inspection step comprise conditional logic to enable the transmission of an audible prompt based on at least one previous audible reply; and
an editing unit of the server computer is configured to allow an operator to alter the conditional logic.

16. The VDE inspection system according to claim 14, wherein the mobile computing device comprises a display and the inspection plan comprises image information for display on the mobile computing device.

17. The VDE inspection system according to claim 14, wherein the mobile computing device comprises at least one sensor selected from the group consisting of a camera, a scanner, an optical character recognition (OCR) device, an imaging scanner, an RFID reader, a wireless scanner, a serial scanner, and a temperature sensor, wherein the inspection plan comprises audible prompts for the inspector to use the at least one selected sensor to gather data, and wherein an editing unit of the server computer is configured to allow an operator to alter the audible prompts for the inspector to use the at least one selected sensor to gather data.

18. A method for a voice-data entry (VDE) inspection, the VDE inspection method comprising:

receiving, by a computer, an inspection plan from a remote host computer, the inspection plan comprising a sequence in which inspection steps are to be performed, the inspection plan further comprising sections into which the inspection steps are organized wherein the sequence of inspection steps comprises at least one inspection step marked as mandatory in the inspection plan;

receiving, by the computer, instructions from an operator to edit; creating, by the computer in response to the receiving of the instructions from operator to edit, an edited inspection plan;

translating, by the computer, the edited inspection plan into a voice plan, the voice plan comprising audible prompts for each inspection step of the edited inspection plan; communicating, by the computer, the voice plan's audible prompts to a voice-enabled, mobile computing device; providing, by the mobile computing device, by way of at least one speaker of the mobile computing device, the audible prompts to an inspector; receiving, by the mobile computing device, by way of at least one microphone of the mobile computing device, the inspector's audible reply for each in response to each audible prompt and communicating, by the mobile computing device, the audible replies back to the computer;

validating, by the computer, the audible replies and translating the audible replies into inspection results; uploading, by the computer, the inspection results to the remote host computer;

receiving, by the mobile computing device, by way of the at least one microphone, an audible instruction from the inspector to skip a section of the edited inspection plan, wherein the section is skipped by skipping a step within the section;

skipping, by the mobile computing device, the section of the edited inspection plan identified by the audible instruction to skip the section;

providing, by the mobile computing device, by way of the at least one speaker, audible prompts for an other section of the edited inspection plan;

receiving, by the mobile computing device, by way of the at least one microphone, the inspector's audible replies to the audible prompts for the other section;

determining, by the mobile computing device, whether the section skipped by the inspector comprises of the step skipped which is marked as the at least one mandatory inspection step in the edited inspection plan;

in response to completion of the other section and in an instance in which the section skipped by the inspector comprises the step skipped which is marked as the at least one mandatory inspection step in the edited inspection plan, the mobile computing device providing, by way of the at least one speaker, at least one audible prompt for completing the skipped section of the edited inspection plan by performing the step skipped which is marked as the at least one mandatory inspection step;

determining, by the mobile computing device, that the inspection plan is complete based on determining that the sequence of inspection steps, including the at least one mandatory inspection step, is completed, determining, by the computer, whether a new part is to be inspected during inspection; and in response to the determining that the new part is to be inspected, modifying by the computer, the existing inspection plan by adding new inspection steps corresponding to the new part.

19. The method according to claim 18, wherein the creating of the edited inspection plan comprises altering, by the computer, at least one of: the sequence in which the inspection steps are to be performed, and the sections into which the inspection steps are organized.

20. The method according to claim 18, wherein editing is accomplished using an editor unit with a graphical user interface running on the computer.

* * * * *